W. L. SWITZER.
Connecting-Rods.

No. 145,917.　　　　　　　　　　Patented Dec. 23, 1873.

Witnesses.
Chas. B. Steele
G. E. Upham

Inventor.
William L. Switzer
Chipman Hosmer & Co.,
Attys.

UNITED STATES PATENT OFFICE.

WILLIAM L. SWITZER, OF ZANESVILLE, OHIO.

IMPROVEMENT IN CONNECTING-RODS.

Specification forming part of Letters Patent No. 145,917, dated December 23, 1873; application filed May 31, 1873.

*To all whom it may concern:*

Be it known that I, WILLIAM L. SWITZER, of Zanesville, in the county of Muskingum and State of Ohio, have invented a new and valuable Improvement in Connecting-Rods; and I do hereby declare that the following is a full, clear, and exact description of the construction and operation of the same, reference being had to the annexed drawings making a part of this specification, and to the letters and figures of reference marked thereon.

Figure 1:
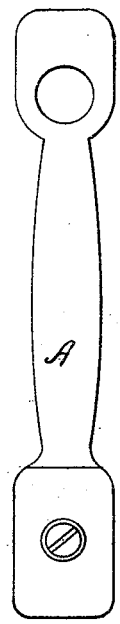
Figure 3:
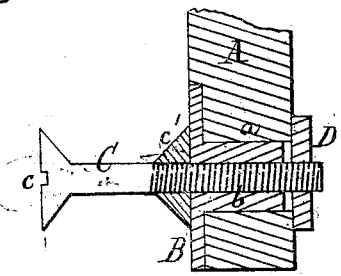
Figure 2:
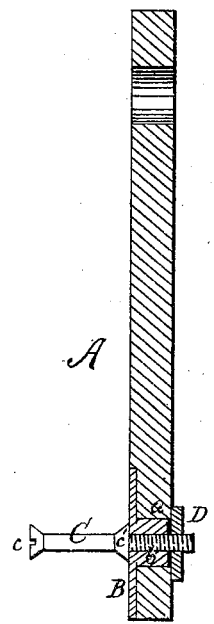

Figure 1 of the drawings is a representation of my improved pitman by an elevation. Fig. 2 is a longitudinal central section of the same. Fig. 3 is a detailed and enlarged view of the improved parts.

The object of my invention is to avoid a one-sided bearing in wheels which serve as fly-wheels, as, for example, in sewing-machines, and are moved by treadle-motion, by applying the moving-power within the lateral center of its axial bearing.

In the drawings, A represents a connecting-rod or pitman for a sewing-machine, which is provided with a hole, $a$, in its head. Into said hole the nut $b$ of a plate, B, is inserted, which is provided with inside screw-threads, like a nut, and into which a bolt, C, is screwed. The bolt C is provided with a straight or conical side bearing, $c$, at the head, and a straight or conical nut, $c'$, which serves as the other side bearing, and may be adjusted longitudinally by screwing it onto the screw-threads of the bolt. The bolt is screwed into the plate B, and is secured to the head of the connecting-rod A by a nut, D, which overlaps the hole $a$, and serves as a check-nut by preventing the bolt C from turning. The nut $b$ is made of such length that it will not come in contact with the nut D. The wheel, to which the described pitman communicates power and motion, has a bearing for the bolt or non-revolving wrist-pin C in one of its arms or in its filling, so that the middle of its axis and the middle of the central axis of the wheel fall into a line, which is vertical to the said central axis of the wheel. This is the condition for a bearing, which is balanced at both ends, and shows no inclination to wear diagonally toward the side where the pitman is attached, which is especially the case with the central bearings of fly-wheels on which the wrist-pins project, to a great extent, over the main or central bearings of the wheels.

To attach my improved pitman to a fly-wheel, the nut D is unscrewed, the wrist-pin or bolt C is then unscrewed, and, lastly, the conical side bearing $c'$. The bolt is then inserted into its bearing; the conical side bearing $c'$ is screwed on and adjusted; the pitman A is then brought near the end of the bolt C, and the same screwed into the plate B until checked by the bearing $c'$. Lastly, the nut B is screwed on and the bolt C rigidly fastened, and the pitman is ready for operation.

What I claim as new, and desire to secure by Letters Patent, is—

The pitman for sewing-machines having the adjustable wrist attachment, consisting of the plate B with nut $b$, the wrist-bolt with the head and side bearing $c$, and adjustable side bearing $c'$, and nut D, as shown and described.

In testimony that I claim the above I have hereunto subscribed my name in the presence of two witnesses.

WILLIAM L. SWITZER.

Witnesses:
ALLEN MILLER,
T. J. MAGINNIS.